US011970302B2

(12) United States Patent
Zanella et al.

(10) Patent No.: US 11,970,302 B2
(45) Date of Patent: Apr. 30, 2024

(54) SYSTEM FOR SEMI-AUTOMATICALLY CLOSING FLEXIBLE CONTAINERS

(71) Applicant: COMI PAK ENGINEERING S.R.L. UNIPERSONALE, Schio (IT)

(72) Inventors: Maria Teresa Zanella, Torrebelvicino (IT); Silvia Zanella, Torrebelvicino (IT)

(73) Assignee: COMI PAK ENGINEERING S.R.L.—UNIPERSONALE, Schio (IT)

( * ) Notice: Subject to any disclaimer, the term of this patent is extended or adjusted under 35 U.S.C. 154(b) by 17 days.

(21) Appl. No.: 17/618,093

(22) PCT Filed: Jun. 19, 2020

(86) PCT No.: PCT/IB2020/055787
§ 371 (c)(1),
(2) Date: Dec. 10, 2021

(87) PCT Pub. No.: WO2020/255064
PCT Pub. Date: Dec. 24, 2020

(65) Prior Publication Data

US 2022/0297864 A1 Sep. 22, 2022

(30) Foreign Application Priority Data

Jun. 21, 2019 (IT) ........................ 102019000009780

(51) Int. Cl.
*B65B 51/04* (2006.01)
*B65B 61/06* (2006.01)
(Continued)

(52) U.S. Cl.
CPC .............. *B65B 51/04* (2013.01); *B65B 61/06* (2013.01); *B65B 63/005* (2013.01); *B65C 7/00* (2013.01)

(58) Field of Classification Search
CPC ....... B65B 51/04; B65B 61/06; B65B 63/005; B65C 7/00
(Continued)

(56) References Cited

U.S. PATENT DOCUMENTS 3,973,294 A 8/1976 Pfizenmaier
2001/0009089 A1 * 7/2001 Todd ....................... B29C 65/18 53/64
(Continued)

FOREIGN PATENT DOCUMENTS

DE 29600142 U1 3/1996
EP 2665655 A1 11/2013
(Continued)

*Primary Examiner* — Anne Marie Antonucci
*Assistant Examiner* — Luis G Del Valle
(74) *Attorney, Agent, or Firm* — Carmel Patent Agency; Robert Ballarini

(57) ABSTRACT

A system for semi-automatically closing flexible containers includes a continuous deformable web and a semi-automatic device for closing containers with the web. The device includes a frame having a slot for receiving an open end of one container at a time, feeding means for feeding the web, web cutting means and deforming and closing means. The web has labels integrally joined thereto at a substantially constant distance from each other, to thereby form a labeled web having a predetermined cross section. The cutting means are configured to cut the web into sections whose length is equal to the distance and to form labeled clips with the labels located halfway of the sections, The deforming and closing means are coordinated with the cutting means to deform and close each labeled clip around the open end of one container at a time while keeping the labels centered on each container.

11 Claims, 3 Drawing Sheets

(51) Int. Cl.
*B65B 63/00* (2006.01)
*B65C 7/00* (2006.01)

(58) Field of Classification Search
USPC ........................................................ 53/138.3
See application file for complete search history.

(56) References Cited

U.S. PATENT DOCUMENTS

| | | | | |
|---|---|---|---|---|
| 2004/0177931 | A1* | 9/2004 | Baumli ................. | G09F 3/0289 156/539 |
| 2014/0339358 | A1* | 11/2014 | Swartley ................ | B64D 45/02 439/32 |
| 2016/0332755 | A1* | 11/2016 | Yasuda ................... | B65B 57/10 |

FOREIGN PATENT DOCUMENTS

| | | | | |
|---|---|---|---|---|
| JP | 2014006468 | A | 1/2014 | |
| WO | 2012098526 | A1 | 7/2012 | |
| WO | WO-2012098526 | A1 * | 7/2012 | ............. B65B 51/04 |

* cited by examiner

SYSTEM FOR SEMI-AUTOMATICALLY CLOSING FLEXIBLE CONTAINERS

FIELD OF THE INVENTION

The present invention generally finds application in the field of flexible container packaging systems and particularly relates to a system for semi-automatically closing flexible containers.

BACKGROUND ART

Containers made of a flexible material, such as plastic, paper and/or a biodegradable material, with an opening designed to allow introduction and/or removal of one or more products, and to be re-closed using a tie, a tape or any other rigid or semi-rigid closing sheet element, have been long known to be used in the field of packaging systems.

Generally, the closing element is wrapped in such a manner as to allow a user to remove it to re-open the container and withdraw products through the opening.

In particular, tapes or straps are known in the art, usually as clips, generally made of polymer or metal material, which are fed from a coil and cut to size immediately before the closing step, to encircle the container proximate the opening, and re-close it.

Devices are also known for semi-automatically closing containers, which have a frame with a closing station thereon, for the container to be manually placed thereon and closed.

In addition, a housing for a continuous web bobbin is located proximate the station and is unwound in a controlled manner using an intermittent driving disk, to move one portion of web of predetermined length at a time next to the closing station.

The portion of the web that is intended to form the clip to be wound around the container is cut by means of cutting means having a blade that is movable against the closing web.

Then, the clip is pushed by deforming and closing means into the closing station, in which an abutment wall causes it to deform and encircle the container to close it.

A first drawback of these known solutions is that the movements of the cutting, deforming and closing means are generally performed by pneumatic actuators controlled by a central control unit for controlling supply to the various devices, to coordinate their movements.

This drawback is particularly undesirable due to the need for a special system for supplying compressed air to the pneumatic actuators, which increases the overall costs and the occurrence of limitations in plant installation procedures.

Furthermore, during operation pneumatic actuators generally release oily particles in the external environment, with the risk of air contamination.

A further drawback of this solution is that the use of compressed air prevents accurate coordination of the movements of the various pneumatic actuators, resulting in the formation of clips having different lengths.

This drawback is particularly undesirable if, once the container has been closed, labels are automatically or manually added to the continuous deformable web, with information concerning the products contained in the container, with the risk that the clip may be opened and/or the label and the information carried thereby may be lost.

Another serious drawback of this solution is that, due to the impossibility of applying a labeled clip to the container, the device may be only used to close pre-printed containers differing according to the type of products contained therein.

This drawback contributes to longer calibration times and larger storage space for the different batches of containers, resulting in increased manufacturing costs.

In an attempt to at least partially obviate these drawbacks, systems have been developed for forming labeled clips having adjustable lengths.

JP2014006468 discloses a system for closing flexible containers by means of labeled clips that can be closed by bonding or interlocking using a system having a continuous deformable web and a device for closing containers with said web.

A first drawback of this known solution is that the system is only used to close labeled clips of flexible type.

In addition, this solution requires the provision of conveyor means for the labeled clips and the label bonding means, respectively, resulting in increased manufacturing and maintenance costs.

U.S. Pat. No. 3,973,294 discloses a closing web for packaging having integral labels spaced along the longitudinal extent of the web.

DE 29600142 discloses a device for simultaneous application of a clip web and a label web separated from each other on objects or packages of various products.

Technical Problem

In view of the prior art, the technical problem addressed by the present invention is, in short, to provide a system for semi-automatically closing flexible containers by means of labeled clips that allows labels to be positioned at the center of each clip and each clip to be positioned at the center of the open end of each container to prevent label deformation.

Disclosure of the Invention

The object of the present invention is to obviate the above drawback, by providing a system for semi-automatically closing flexible containers, that is highly efficient and relatively cost-effective.

A particular object of the present invention is to provide a system for semi-automatically closing flexible containers as described hereinbefore, that allows the label to be positioned at the center of the clip.

A further object of the present invention is to provide a system for semi-automatically closing flexible containers as described hereinbefore that can effectively close the container.

Another object of the present invention is to provide a system for semi-automatically closing flexible containers as described hereinbefore that allows synchronized actuation of its components by accurate, inexpensive means.

A further object the present invention is to provide a system for semi-automatically closing flexible containers as described hereinbefore, that can avoid label deformation during processing.

Yet another object of the present invention is to provide a system for semi-automatically closing flexible containers as described hereinbefore, that requires no particular operator skills during closing of the container.

A further object of the present invention is to provide a system for semi-automatically closing flexible containers as described hereinbefore that has a small size.

Another object of the present invention is to provide a system for semi-automatically closing flexible containers as described hereinbefore that can use labeled clips made of a material that can be printed, deformed by engraving or marking or labeled clips adapted to receive an adhesive.

These and other objects, as more clearly explained hereinafter, are fulfilled by a system for semi-automatically closing flexible containers, as defined in claim 1, which comprises a continuous deformable web a semi-automatic device for closing containers with the web.

The device comprises a frame having a slot for receiving an open end of one container at a time, feeding means for feeding the web, cutting means for cutting the web and deforming and closing means.

In a peculiar aspect of the invention, the web has labels integrally joined thereto at a substantially constant distance from each other, to thereby form a labeled web having a predetermined cross section, the cutting means are configured to cut the web into sections whose length is equal to the distance and to form labeled clips with the labels located halfway of the sections.

Advantageously, the deforming and closing means are coordinated with the cutting means to deform and close each labeled clip around the open end of one container at a time while keeping the labels centered on each container. Also, the frame comprises a substantially horizontal plate with at least one vertical stiffening wall and the feeding means comprise a passage that extends along the wall and has a greater cross section than the labeled web to avoid any deformation of its labels as it is being fed.

With this combination of features, the system allows the container to be closed by the labeled clip with the label positioned at the center of the container and without no label deformation.

Advantageously, the device comprises sensor means for detecting the position of the labeled web or each individual clip and for controlling actuation of the cutting means and the deforming and closing means in coordination with the feeding means to keep the labels at the center of each clip and each clip at the center of the open end of each container, as defined in claim 3.

By this arrangement, label deformation is prevented as the web is being fed along the passage and the label is accurately centered relative to the container and the sections of the labeled clip.

Advantageous embodiments of the invention are obtained in accordance with the dependent claims.

BRIEF DESCRIPTION OF THE DRAWINGS

Further features and advantages of the invention will be more apparent from the detailed description of a preferred, non-exclusive embodiment of a system for semi-automatically closing flexible containers, which is described as a non-limiting example with the help of the following drawings, in which.

DETAILED DESCRIPTION OF A PREFERRED EXEMPLARY EMBODIMENT

Figure 1A:
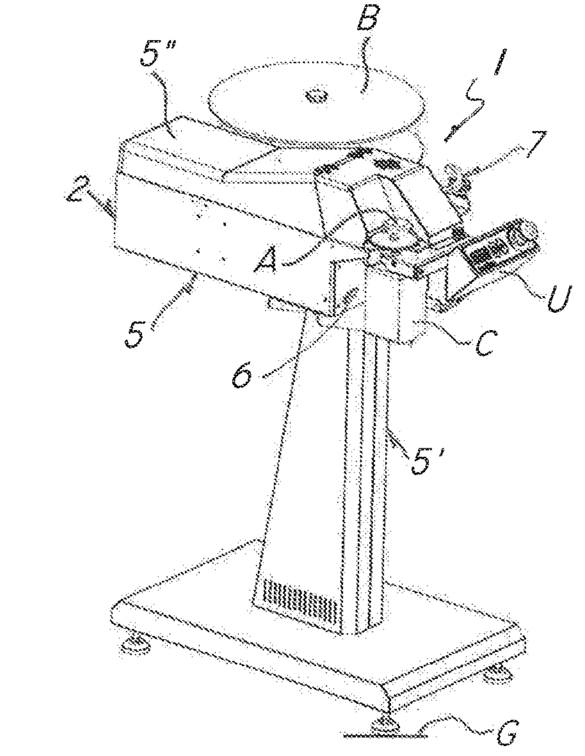
FIGS. 1A and 1B are perspective views of a system for semi-automatically closing flexible containers according to the invention, with and without an upper cover respectively.

Particularly referring to the figures, there is shown a system for semi-automatically closing flexible containers, generally designated by reference numeral 1, for closing containers C having an open end A for withdrawal of products contained therein.

By way of a non-limiting example, the containers C may be made of a flexible material, such as paper, plastic, and/or a degradable material and are designed to contain products of any kind, including food products, with no particular limitation.

The system 1 comprises a bobbin B for receiving a deformable web N wound thereupon, which has a band 4 made of semi-rigid and deformable material with an upper edge 4A and a lower edge 4B designed to face the opening A and the bottom B of the container C respectively.

In a well-known manner, the band 4 may be substantially flat and made of metal, for example aluminum, or paper or a polymeric material with thread-like cores 4C made of metal or non-metal material and extending along its entire length proximate the edges 4A, 4B to increase its rigidity, while maintaining its deformability.

Figure 2A:
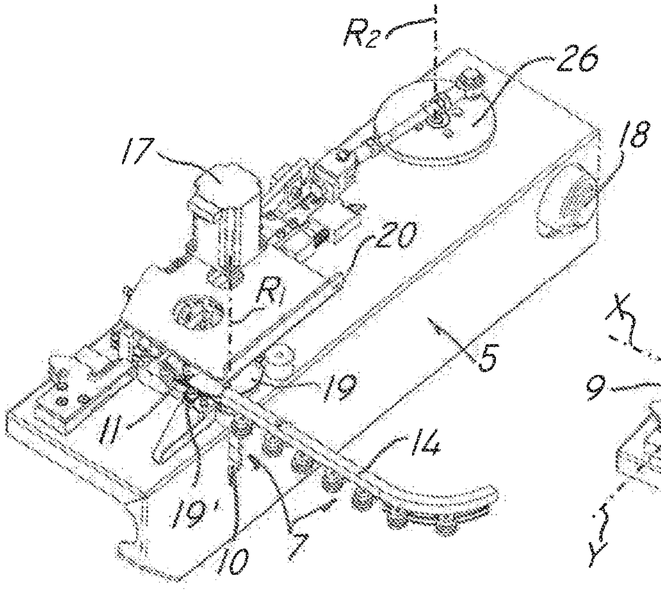
FIGS. 2A and 2B are an exploded perspective view and a detailed perspective view respectively of a first detail of the system of FIG. 1.
Figure 2B:
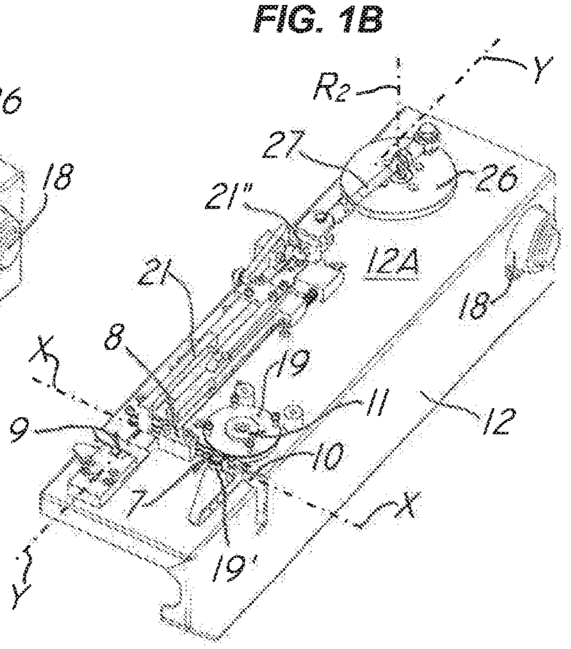

As shown in FIGS. 1A and 2B, the system 1 comprises a semi-automatic device 2 for closing the containers C by means of the web N.

The structure of the semi-automatic device 2 may be, for example but without limitation, as described and claimed in European Patent EP2665655 by the applicant hereof, whose contents are incorporated herein by reference.

The device 2 may be of portable type and adapted to be placed in any room with a connection to the mains or any other source of electric voltage and comprises a frame 5 adapted to be placed on a pedestal 5' resting on the ground G or, alternatively, the frame 5 may be placed on a supporting surface G.

The frame 5 has a slot 6 formed therein for receiving the open end A of a one container C at a time and the device 2 comprises feeding means 7 for feeding the web N.

Figure 5A:
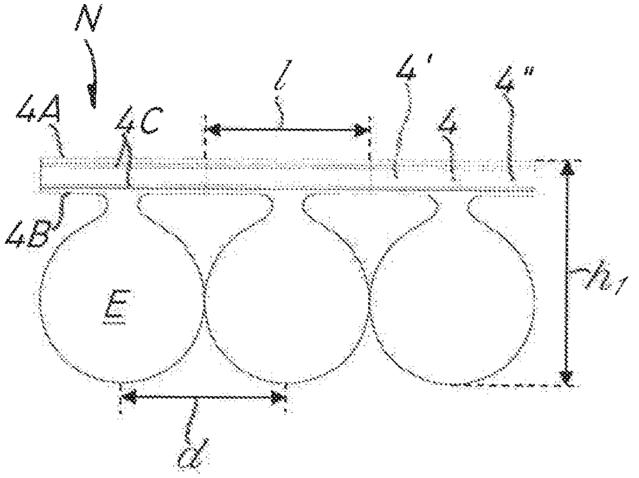
FIGS. 5A and 5B are a front view and a perspective view respectively of a portion of the continuous deformable web as used in the system of FIG. 1.
Figure 5B:
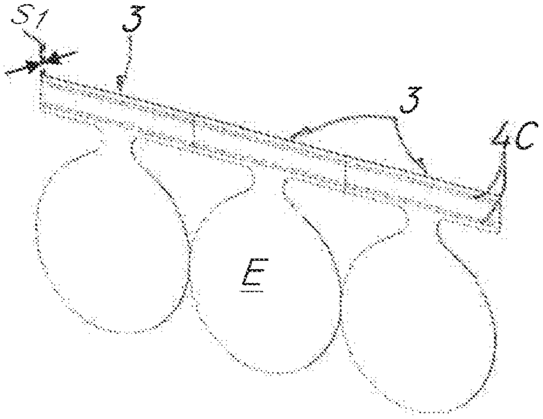

According to the invention, the web has labels E integrally joined thereto at a substantially constant distance d from each other, to thereby form a labeled web N having a predetermined cross-section with a thickness s1 and a height h1. As shown in FIGS. 5A and 5B, the labels E may have any plan shape, e.g. a circular or polygonal shape.

The device 2 comprises cutting means 8 for cutting the web N into sections 4', 4" whose length 1 is equal to the distance d to form individual labeled clips 3, with the labels E kept halfway of the sections 4', 4".

In other words, the length of the sections 4', 4" is equal to half the length I of each labeled clip 3.

Advantageously, deforming and closing means 9 are provided downstream of the cutting means 8, for deforming and closing each labeled clip 3 around the open end A of one container C at a time, with the labels E kept centered on each container C.

Conveniently, the deforming and closing means 9 are coordinated with the cutting means 8 and the feeding means 7 comprise, upstream from the cutting means 8 and the deforming and closing means 9, a passage 10 formed in the frame 5 to convey the labeled web N toward the aforementioned cutting means 8 and deforming and closing means 9.

Of course, the system 1 and the device 2 of the invention are able to cut and close a substantially continuous web N, even without labels E, to form individual unlabeled clips designed to be closed around the open end A of one container C at a time.

In order to allow the labels E to be positioned halfway of the sections 4', 4'', the device 2 further comprises: sensor means 11 for detecting the position of the labeled web N or each individual clip 3 and controlling the actuation of the cutting means 8 and the closing means 9 in coordination with the feeding means 7.

It will be appreciated that the system 1 can keep the labels E at the center of each clip 3 and each clip 3 at the center of the open end A of each container C, as better explained below.

Figure 3:
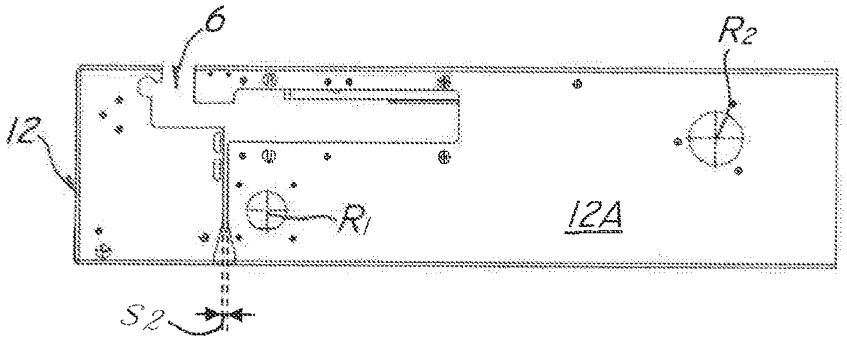
FIGS. 3 and 4 are a plan view and a perspective view respectively of a detail of the system of FIG. 2B.
Figure 4:
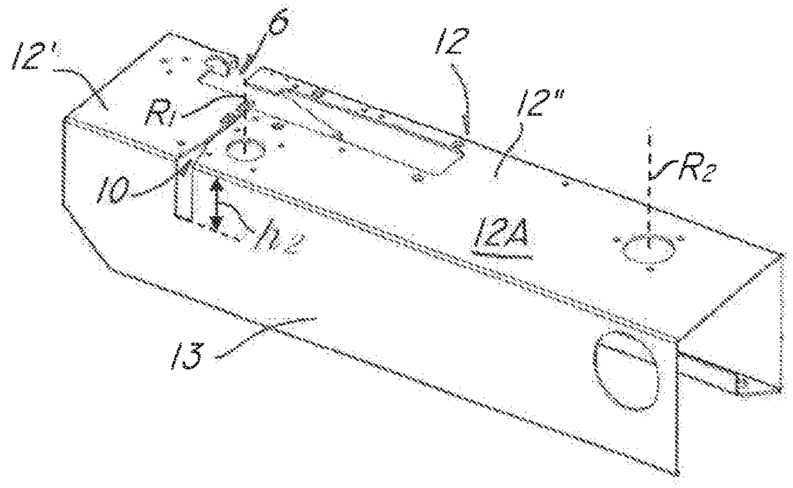

Conveniently, the frame 5 comprises a substantially horizontal plate 12 with the slot 6 formed therein and the feeding means 7, the cutting means 8, the closing and deforming means 9 arranged thereon and with the passage 10 formed therein, as shown in FIGS. 3 and 4.

According to a preferred configuration of the invention, the passage 10 extends throughout the top surface 12A of the plate 12, thereby creating a separation between two flat surfaces 12', 12'' thereof.

Furthermore, the plate 12 has at least one vertical stiffening wall 13 located at one edge of the plate 12 and configured to join the flat portions 12', 12''.

The passage 10 is substantially uniform, extends along the stiffening wall 13 and has a cross-section having a width s2 and a height h2.

According to the invention, the cross-section of the passage 10 is greater than the cross-section of the labeled web N to prevent the labels E from interfering with the frame 5 and from being deformed as the web N is being fed.

In particular, both the width s2 and the height h2 of the passage 10 are greater than the thickness s1 and the height h1 of the labeled web N.

Conveniently, the feeding means 7 may further comprise guide means 14 for the web N, which are adapted to unwind it from the bobbin B and guide it toward the passage 10 in a substantially vertical position and with the labels E facing the supporting surface G.

Figure 6A:
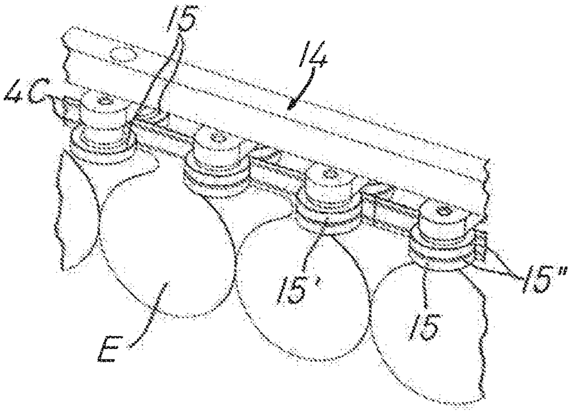
FIGS. 6A and 6B are respective perspective views of first and second embodiments of a second detail of the system of FIG. 2A.

As shown in FIGS. 2A and 6A, the guide means 14 may comprise a plurality of vertically-extending rollers 15, mounted in opposed pairs, and of brass- or ball bearing-mounted type, each having a peripheral surface 15' designed to contact the web N at the band 4.

Figure 6B:
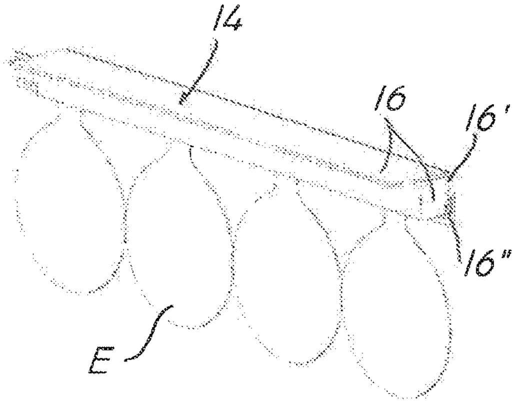

In an alternative embodiment, as shown in FIG. 6B, the guide means 14 may comprise a pair of profiled elements 16 with mutually facing contact surfaces 16' configured to contact the web N at the band 4.

In the above discussed embodiments of the guide means 14, both the peripheral surface 15' of the rollers 15 and the contact surface 16' of the profiled elements 16 may comprise corresponding horizontal recesses 15'', 16'' which are able to interact with the possible metal thread-like cores 4C in the band 4 of the clips 3.

In a further particular aspect of the invention, the system 1 comprises a first electric motor 17 for driving the feeding means 7 and a second electric motor 18 for driving the cutting means 8 and the deforming and closing means 9.

In a well-known manner, the first motor 17 and the second motor 18 may be controlled by a central control unit U through sensor means 11 so that the second motor 18 will be actuated when the first motor 17 is idle and the web N is cut and later properly deformed.

Of course, the feeding means 7, the cutting means 8 and the deforming and closing means 9 may be driven by a single electric motor controlled by the central control unit U and through the sensor means 11, without departure from the scope of the present invention.

Thus, the system 1 affords synchronized actuation of its parts using accurate and inexpensive means.

Conveniently, the feeding means 7 comprise a driving disk 19 located proximate the passage 10 to interact with the web N from the bobbin B to transfer it from the guide means 14 to the cutting means 8 and to the deforming and closing means 9 in a substantially horizontal first direction X parallel to the passage 10 and to the top surface 12A of the plate 12, as better shown in FIGS. 2B, 3 and 4.

The feeding disc 19 may be adjacent to a friction disc 19' to form a sliding surface that is intended to contact the web N to cause it to slide and be unwound from the bobbin B.

The two discs 19 and 19' may comprise a predetermined diameter ratio and may rotate about respective substantially parallel and vertical rotation axes. In particular, the feeding disc 19 will be a driving disc, whereas the friction disc 19' may be driven and idly or friction-mounted.

As shown in FIG. 2A, the feeding disc 19 is keyed to the first motor 17 which comprises a first shaft rotating about a first, substantially vertical rotation axis R1.

In addition, the first motor 17 may be rigidly joined to a substantially flat element 20 mounted above or below the plate 12 and proximate the passage 10 to further stiffen the plate 12.

According to the preferred configuration of the invention, the sensor means 11 may comprise at least one position sensor adapted to read the position of the driving disk 19 and to detect the position of the labeled web N, namely to read the position of the label E.

In an alternative embodiment, the sensor means 11 may comprise an incremental or absolute encoder adapted to read the position of the shaft of the first motor 17 and detect the position of the labeled web N.

Figure 7A:
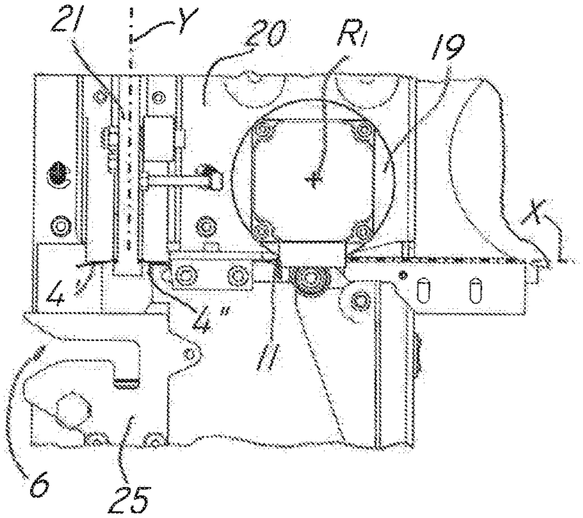
FIGS. 7A, 7B and 7C are plan views of the various steps of forming and closing the labeled clip using the system of FIG. 1.
Figure 7B:
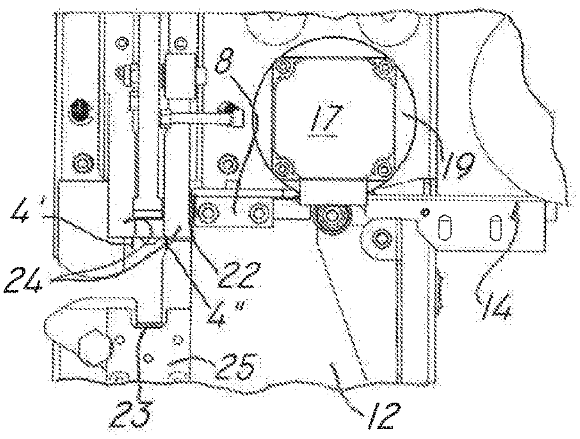

As best shown in FIGS. 2A, 2B and in FIGS. 7A to 7B, the cutting means 8 comprise an elongate slider 21 intended to slide on brass bearings or recirculating-ball slide guides in a substantially horizontal second direction Y orthogonal to the first direction X and the plate 12 may comprise a cutting seat 22 located between the feeding disc 19 and the closing slot 6.

Figure 7C:
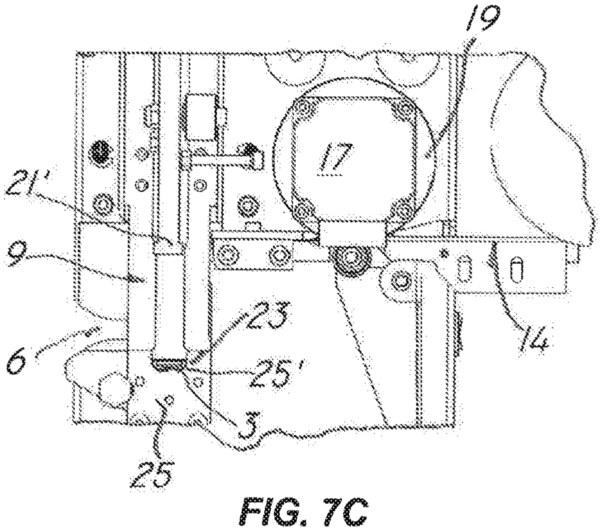

Thus, the cutting means 8 may intercept the band 4 of the web N in the cutting seat 22, and cause its separation to form the labeled clip 3, as shown in FIG. 7A, which is then pushed into a forming seat 23, located at the slot 6, which is acted upon by the deforming and closing means 9, also movable in the second direction Y, as shown in FIG. 7C.

Advantageously, the deforming and closing means 9 may comprise pre-shaping means 24 which act on the labeled clip 3 to form the sections 4', 4'' with a substantial U shape having its concavity oriented in the second direction Y and facing the forming seat 23, as shown in FIG. 7B.

Conveniently, a shaping element 25 may be provided inside the forming seat 23, with a substantially vertical abutment surface 25' transverse to the second direction Y and having curved walls adapted to deform the sections 4', 4'' of the labeled clip 3 to wrap them around the container C, to thereby close the open end A.

In a well known manner, the slider 21 may be movable in the second direction Y between a first rearward end position and a second forward end position in which it interacts with the web N.

Furthermore, the slider 21 has a first end 21' located proximate the slot 6 and a second end 21", opposite the first end 21' and driven by the second motor 18.

In the embodiment of the figures, the second motor 18 is located below the plate 12 and comprises a second shaft, rotating about a substantially vertical second rotation axis R2, and keyed to a transmission element 26, possibly with the interposition of a reduction gear, not shown.

Figure 1B:
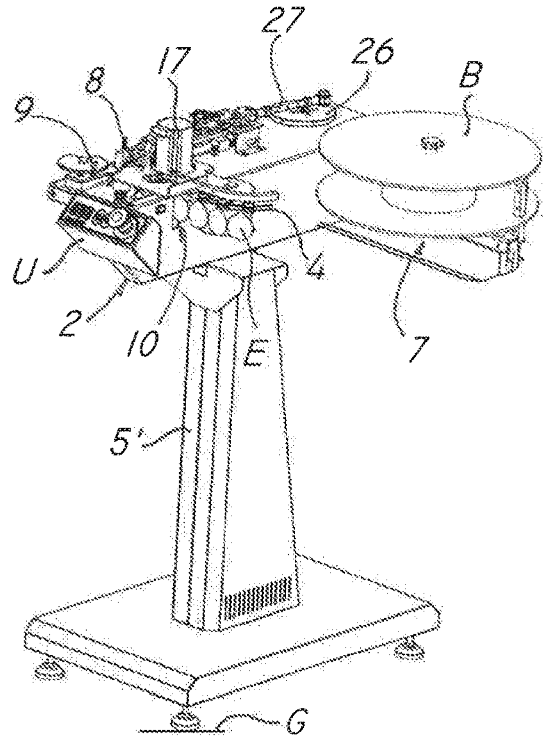

As best shown in FIGS. 1B, 2A and 2B, the transmission element 26 may comprise an articulated linkage 27 configured to move the slider 21 and transfer the motion of the second motor 18 to the latter and to allow coordinated movement of the cutting means 8, the pre-shaping means 24 and the deforming and closing means 9.

The sizes of the articulated linkage 27 and the transmission element 26 and their relative positions, will provide coordination of the movements of the cutting means 8, the pre-shaping means 24 and the deforming and closing means 9, according to arrangements known to the skilled person, which do not need further explanation.

In a particular variant of the system 1 of the invention, a stamping station may be provided, which is mounted at the side of the plate 12 and has means for dispensing dyeing material to the label E or means for engraving the latter.

Also, an upper cover 5" may be provided, to protect the cutting means 8, the deforming and closing means 9 and, at least partially, the feeding means 7.

It will be appreciated that the system 1 of the invention affords semi-automatic closing of flexible containers C using labeled clips 3 made of a material that can be printed, deformed by engraving or marking or using labeled clips 3 adapted to receive an adhesive.

In a further aspect, the invention relates to a method of semi-automatically closing flexible containers C by means of a system 1 of the above discussed type.

The method of the invention includes a first step a) of providing a continuous deformable web N for making clips 3 and a second step b) of integrally joining a plurality of labels E to the web N, at a substantially constant distance d from each other.

These steps may be followed by the steps of c) cutting the web N into sections 4', 4" whose length I is equal to the distance d to form individual labeled clips 3 with the labels E positioned halfway of the sections 4', 4" and d) deforming and closing each labeled clip 3 around the open end A of one container C at a time, while keeping each label E centered on a respective container C.

It will be appreciated from the foregoing that the system for semi-automatically closing flexible containers according to the invention fulfills the intended objects and namely allows the labels to be placed at the center of each clip and each clip to be placed at the center of the open end of each container.

The system of this invention is susceptible of a number of changes and variants, within the inventive concept disclosed in the appended claims.

While the modular system has been described with particular reference to the accompanying figures, the numerals referred to in the disclosure and claims are only used for the sake of a better intelligibility of the invention and shall not be intended to limit the claimed scope in any manner.

Reference herein to "one embodiment" or "the embodiment" or "some embodiments" indicates that a particular characteristic, structure or element that is being described is included in at least one embodiment of the inventive subject matter.

Furthermore, the particular characteristics, structures or elements may be combined together in any suitable manner to provide one or more embodiments.

INDUSTRIAL APPLICABILITY

The present invention may find application in industry, because it can be produced on an industrial scale in factories operating in the field of flexible container packaging.

The invention claimed is:

1. A system for semi-automatically closing flexible containers, comprising a continuous deformable web and a semi-automatic device for closing containers with said web, wherein said device comprises a frame having a slot for receiving an open end of one container at a time, feeding means for feeding said web, cutting means for cutting said web and deforming and closing means, wherein labels are integrally joined to said web and are arranged at a substantially constant distance from each other, to form a labeled web having a predetermined cross-section, said cutting means being configured to cut said web into sections whose length is equal to said distance and to form individual labeled clips while keeping said labels between said sections, said deforming and closing means being coordinated with said cutting means to deform and close each labeled clip around the open end of one container at a time, while keeping said labels centered on each container, said frame having a substantially horizontal plate which has at least one vertical stiffening wall a passage which extends along said wall and has a greater cross section than said labeled web having said labels to avoid any deformation of labels of the labeled web as the labeled web is being fed.

2. The system as claimed in claim 1 wherein said passage is substantially uniform and a width thereof is greater than a thickness of said web having said labels and a height of the passage is greater than a height of said web having said labels.

3. The system as claimed in claim 1, wherein said device comprises sensor means for detecting a position of the web having said labels or each individual clip and for controlling actuation of said cutting means and said deforming and closing means in coordination with said feeding means to keep the labels at the center of each clip and each clip at the center of the open end of each container.

4. The system as claimed in claim 3, further comprising a first electric motor for driving said feeding means and a second electric motor for driving said cutting means and said deforming and closing means, wherein said feeding means comprise a driving disk located proximate said passage and configured to interact with the web having said labels to transfer the web in a substantially horizontal first direction and parallel to said passage and to a top surface of said plate, said first motor having a first shaft rotating about a substantially vertical first rotation axis and keyed to said driving disk, and wherein said sensor means comprise at least one position sensor which is adapted to read the position of said driving disk and to detect the position of the labeled web having said labels and/or of each individual label.

5. The system as claimed in claim 3, further comprising a first electric motor for driving said feeding means and a second electric motor for driving said cutting means and said deforming and closing means, wherein said feeding means comprise a driving disk located proximate said passage and configured to interact with the web having said labels to transfer the web in a substantially horizontal first direction and parallel to said passage and to a top surface of said plate, said first motor having a first shaft rotating about a substantially vertical first rotation axis and keyed to said driving disk, and wherein said sensor means comprise an incremental or absolute encoder adapted to read the position of the shaft of said first motor and detect the position of the web having said labels.

6. The system as claimed in claim 1, further comprising a first electric motor for driving said feeding means and a second electric motor for driving said cutting means and said deforming and closing means.

7. The system as claimed in claim 6, wherein said first motor is rigidly joined to a substantially flat element located above or below said plate and proximate said passage to further stiffen said plate.

8. The system as claimed in claim 6, wherein said feeding means comprise a driving disk located proximate said passage and configured to interact with the web to transfer the web in a substantially horizontal first direction and parallel to said passage and to a top surface of said plate, said first motor having a first shaft rotating about a substantially vertical first rotation axis and keyed to said driving disk.

9. The system as claimed in claim 1, further comprising a bobbin on which the web having said labels is wound, said feeding means comprising guide means for the web, for guiding the web toward said passage.

10. The system as claimed in claim 9, wherein said guide means comprise a plurality of opposed rollers of the plain-bearing type or ball bearing-mounted type, said opposed rollers each having a peripheral surface which is configured to contact the web.

11. The system as claimed in claim 9, wherein said guide means comprise a pair of mutually facing profiled surfaces, each configured to contact the web.

* * * * *